United States Patent
Sakurai et al.

(10) Patent No.: US 9,982,065 B2
(45) Date of Patent: May 29, 2018

(54) METHOD OF PRODUCTION OF CONJUGATED DIENE RUBBER

(71) Applicant: ZEON CORPORATION, Tokyo (JP)

(72) Inventors: Takuro Sakurai, Tokyo (JP); Takashi Iizuka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days. days.

(21) Appl. No.: 15/322,285

(22) PCT Filed: Jun. 26, 2015

(86) PCT No.: PCT/JP2015/068527
§ 371 (c)(1),
(2) Date: Dec. 27, 2016

(87) PCT Pub. No.: WO2015/199226
PCT Pub. Date: Dec. 30, 2015

(65) Prior Publication Data
US 2017/0137555 A1   May 18, 2017

(30) Foreign Application Priority Data
Jun. 27, 2014   (JP) ................................ 2014-132472

(51) Int. Cl.
| | |
|---|---|
| *C08C 19/22* | (2006.01) |
| *C08F 230/06* | (2006.01) |
| *C08F 230/08* | (2006.01) |
| *C08C 19/25* | (2006.01) |
| *C08F 297/04* | (2006.01) |
| *B60C 1/00* | (2006.01) |
| *C08F 8/30* | (2006.01) |

(52) U.S. Cl.
CPC ............ *C08C 19/22* (2013.01); *B60C 1/0016* (2013.01); *C08C 19/25* (2013.01); *C08F 8/30* (2013.01); *C08F 230/06* (2013.01); *C08F 230/08* (2013.01); *C08F 297/046* (2013.01)

(58) Field of Classification Search
CPC .. C08F 8/30; C08F 30/06; C08F 30/08; C08F 230/06; C08F 230/08
USPC .................................. 525/342, 374, 375, 379
See application file for complete search history.

(56) References Cited

U.S. PATENT DOCUMENTS

| | | | |
|---|---|---|---|
| 2002/0179218 A1 | 12/2002 | Pierre et al. | |
| 2010/0099866 A1* | 4/2010 | Honma ................. | C07F 7/1836 544/69 |
| 2013/0012651 A1 | 1/2013 | Sasajima et al. | |
| 2015/0133600 A1 | 5/2015 | Iizuka et al. | |

FOREIGN PATENT DOCUMENTS

| | | |
|---|---|---|
| JP | 2003531257 A | 10/2003 |
| WO | 2011/105362 A1 | 9/2011 |
| WO | 2014/050341 A1 | 4/2014 |

OTHER PUBLICATIONS

Sep. 29, 2015 International Search Report issued in International Patent Application No. PCT/JP2015/068527.

* cited by examiner

*Primary Examiner* — Marc S Zimmer
(74) *Attorney, Agent, or Firm* — Oliff PLC

(57) ABSTRACT

Production of a conjugated diene rubber includes polymerizing isoprene or a monomer mixture containing isoprene and an aromatic vinyl monomer in an inert solvent by using a polymerization initiator so as to form a polymer block (A) having an active end, mixing the polymer block (A) having an active end and 1,3-butadiene or a monomer mixture containing 1,3-butadiene and an aromatic vinyl monomer to continue a polymerization reaction so as to obtain a conjugated diene polymer chain having an active end and containing a polymer block (A) and a polymer block (B), and reacting a compound represented by the following general formula (1) with the active end of the conjugated diene polymer chain having an active end:

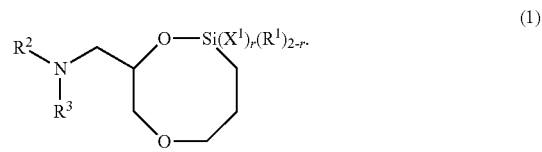

(1)

9 Claims, No Drawings

METHOD OF PRODUCTION OF CONJUGATED DIENE RUBBER

TECHNICAL FIELD

The present invention relates to a method of production of a conjugated diene rubber, more particularly relates to a method of production of a conjugated diene rubber which is excellent in shape stability and which is able to give cross-linked rubber excellent in low heat buildup property and wet grip. Further, the present invention relates to a conjugated diene rubber obtained by this method of production, a rubber composition containing the conjugated diene rubber, and cross-linked rubber thereof.

BACKGROUND ART

In recent years, low heat buildup property has been strongly sought for automobile tires due to environmental issues and resource issues. Furthermore, from the viewpoint of safety, excellent wet grip and strength are demanded. A tire obtained using a rubber composition containing silica as a filler is better in low heat buildup property compared with a tire obtained using the conventionally used rubber composition including carbon black, so it is possible to produce tires more excellent in low fuel consumption.

As a conjugated diene rubber used for giving such a low fuel consumption tire, Patent Document 1 discloses a conjugated diene rubber obtained by reacting a specific tin halide compound with a conjugated diene polymer chain having an isoprene block at one end and an active end at the other end. Further, Patent Document 2 discloses a conjugated diene rubber containing a certain amount or more of a structure comprised of three or more conjugated diene polymer chains bonded together obtained by reacting a specific modifying agent with a conjugated diene polymer chain having an isoprene block at one end and an active end at the other end.

RELATED ART

Patent Documents

Patent Document 1: Japanese Patent Publication No. 2003-531257A
Patent Document 2: WO2011/105362A

SUMMARY OF THE INVENTION

Problem to be Solved by the Invention

However, if considering the increase in performance demanded for automobile tires in recent years, in the future, a conjugated diene rubber enabling the production of a tire having a much better low heat buildup property and wet grip will desirably be used for newly developed tires compared with the tires obtained using the conjugated diene rubber specifically described in these patent documents. Further, as the rubber composition able to be used for such tires, from the viewpoint of improving the production stability and handling ability in the production process, when worked to a predetermined shape (for example, bale shape), the ability to maintain such a predetermined shape well (that is, excellent shape stability) is also sought.

The present invention was made in consideration of such a situation and has as its object the provision of a method of production of a conjugated diene rubber excellent in shape stability and able to give cross-linked rubber excellent in low heat buildup property and wet grip.

Means for Solving the Problem

The present inventors engaged in intensive research to achieve the above object and as a result discovered that by forming a polymer block (A) having an active end and containing a specific amount of isoprene monomer units by using a polymerization initiator in an inert solvent and next forming a polymer block (B) having an active end and containing a specific amount of 1,3-butadiene monomer units and, if necessary, aromatic vinyl monomer units to thereby obtain a conjugated diene polymer chain having an active end and containing a polymer block (A) and a polymer block (B) and then reacting the active end of the conjugated diene polymer chain having an active end with a compound having a 1,6-dioxa-2-silacyclooctane structure where an 8-position is substituted by a tertiary amine structure-containing group, it is possible to make the thus obtained conjugated diene rubber excellent in shape stability and give a cross-linked rubber excellent in low heat buildup property and wet grip, and thereby completed the present invention.

That is, according to the present invention, there is provided a method of production of a conjugated diene rubber comprising a step of polymerizing isoprene or a monomer mixture containing isoprene and an aromatic vinyl monomer in an inert solvent by using a polymerization initiator so as to form a polymer block (A) having an active end and containing 80 to 100 wt % of isoprene monomer units and 0 to 20 wt % of aromatic vinyl monomer units, a step of mixing the polymer block (A) having an active end and 1,3-butadiene or a monomer mixture containing 1,3-butadiene and an aromatic vinyl monomer to continue a polymerization reaction and forming a polymer block (B) having an active end and containing 50 to 100 wt % of 1,3-butadiene monomer units and 0 to 50 wt % of aromatic vinyl monomer units as a continuation of a polymer block (A) so as to obtain a conjugated diene polymer chain having an active end and containing a polymer block (A) and a polymer block (B), and a step of reacting a compound represented by the following general formula (1) with the active end of the conjugated diene polymer chain having an active end:

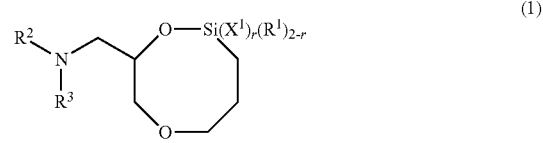

wherein, in the general formula (1), $X^1$ represents a functional group selected from a hydrocarbyloxy group, halogen group, and hydroxyl group, $R^1$ represents a substituted or unsubstituted hydrocarbon group, each of $R^2$ and $R^3$ independently represents a substituted or unsubstituted hydrocarbon group, $R^2$ and $R^3$ may bond with each other to form a ring structure together with the nitrogen atom represented by "N" in the general formula (1), and, when forming the ring structure, $R^2$ and $R^3$ may form a ring structure together with a hetero atom other than the nitrogen atom represented by the "N" in addition to the nitrogen atom represented by the "N", "r" is an integer of 0 to 2.

In the method of production of the present invention, the method preferably further comprises, after obtaining the conjugated diene polymer chain having an active end and containing a polymer block (A) and a polymer block (B), a step of reacting part of the active ends with a tin halide, silicon halide, or compound represented by the general formula (2):

wherein, in the general formula (2), $R^4$ represents a substituted or unsubstituted bivalent hydrocarbon group, $X^2$ represents a halogen group, and M represents a silicon atom or tin atom.

In the method of production of the present invention, in the conjugated diene polymer chain having an active end and containing a polymer block (A) and a polymer block (B), preferably a weight ratio of the polymer block (A) and polymer block (B) is, by (weight of polymer block (A))/(weight of polymer block (B)), 0.001 to 0.1.

In the method of production of the present invention, preferably, in the general formula (1), $R^2$ and $R^3$ bond with each other to faint a piperazine ring structure together with the nitrogen atom represented by the "N" in the general formula (1).

Further, according to the present invention, there is provided a conjugated diene rubber obtained by the above method of production.

Furthermore, according to the present invention, there is provided a rubber composition comprising 100 parts by weight of a rubber component containing the above conjugated diene rubber and 10 to 200 parts by weight of silica.

The rubber composition of the present invention preferably further comprises a cross-linking agent.

Further, according to the present invention, there are provided a cross-linked rubber obtained by cross-linking the rubber composition and a tire containing the cross-linked rubber.

Effects of Invention

According to the present invention, it is possible to provide a conjugated diene rubber excellent in shape stability and able to give a cross-linked rubber excellent in low heat buildup property and wet grip, a rubber composition comprising the conjugated diene rubber, a cross-linked rubber obtained by cross-linking the rubber composition and excellent in low heat buildup property and wet grip, and a tire containing the cross-linked rubber.

DESCRIPTION OF EMBODIMENTS

The method of production of a conjugated diene rubber of the present invention comprises a step of polymerizing isoprene or a monomer mixture containing isoprene and an aromatic vinyl monomer in an inert solvent by using a polymerization initiator so as to form a polymer block (A) having an active end and containing 80 to 100 wt % of isoprene monomer units and 0 to 20 wt % of aromatic vinyl monomer units, a step of mixing the polymer block (A) having an active end and 1,3-butadiene or a monomer mixture containing 1,3-butadiene and an aromatic vinyl monomer to continue a polymerization reaction and forming a polymer block (B) having an active end and containing 50 to 100 wt % of 1,3-butadiene monomer units and 0 to 50 wt % of aromatic vinyl monomer units as a continuation of a polymer block (A) so as to obtain a conjugated diene polymer chain having an active end and containing a polymer block (A) and a polymer block (B), and a step of reacting a compound represented by the later explained general formula (1) with the active end of the conjugated diene polymer chain having an active end.

<Conjugated Diene Polymer Chain Having Active End>

In the method of production of a conjugated diene rubber of the present invention, first, performing a step of polymerizing isoprene or a monomer mixture containing isoprene and an aromatic vinyl monomer in an inert solvent by using a polymerization initiator so as to form a polymer block (A) having an active end and containing 80 to 100 wt % of isoprene monomer units and 0 to 20 wt % of aromatic vinyl monomer units, next, performing a step of mixing the polymer block (A) having an active end and 1,3-butadiene or a monomer mixture containing 1,3-butadiene and an aromatic vinyl monomer to continue a polymerization reaction and forming a polymer block (B) having an active end and containing 50 to 100 wt % of 1,3-butadiene monomer units and 0 to 50 wt % of aromatic vinyl monomer units as a continuation of a polymer block (A), a conjugated diene polymer chain having an active end and containing a polymer block (A) and a polymer block (B) is obtained.

[Polymer Block (A)]

In the conjugated diene polymer chain according to the present invention, the polymer block (A) is not particularly limited so long as a polymer block which contains 80 to 100 wt % of isoprene monomer units and 0 to 20 wt % aromatic vinyl monomer units in the polymer block (A), but preferably contains 85 to 95 wt % of isoprene monomer units and 5 to 15 wt % of aromatic vinyl monomer units, more preferably contains 89 to 95 wt % of isoprene monomer units and 5 to 11 wt % of aromatic vinyl monomer units. If the ratio of contents of the isoprene monomer units and aromatic vinyl monomer units is within the above range, when mixing silica into the conjugated diene rubber, the affinity between the conjugated diene rubber and silica becomes good, the shape stability is improved, and the cross-linked rubber obtained using this can be made excellent in low heat buildup property and wet grip.

As the aromatic vinyl monomer used for forming the aromatic vinyl monomer units contained in the polymer block (A), for example, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, dimethylaminoethylstyrene, etc. may be mentioned. Among these, styrene, α-methylstyrene, or 4-methylstyrene is preferable, while styrene is particularly preferable. Note that, these aromatic vinyl monomers may be used as single types independently or two types or more combined.

The polymer block (A) is preferably comprised of only isoprene monomer units or is comprised of only isoprene monomer units and aromatic vinyl monomer units, but may also contain, as desired in a range not detracting from the inherent properties in the present invention, other monomer units besides the isoprene monomer units and aromatic vinyl monomer units. As the other monomer used for forming the other monomer units, a conjugated diene monomer other than isoprene such as 1,3-butadiene, 2,3-dimethyl-1,3-butadiene, 2-chloro-1,3-butadiene, 1,3-pentadiene, and 1,3-hexanediene; an α,β-unsaturated nitrile such as acrylonitrile and methacrylonitrile; an unsaturated carboxylic acid or acid anhydride of these such as acrylic acid, methacrylic acid, and maleic anhydride; an unsaturated carboxylic acid ester such as methyl methacrylate, ethyl acrylate, and butyl acrylate; a nonconjugated diene such as 1,5-hexadiene, 1,6- heptadiene, 1,7-octadiene, dicyclopentadiene, and 5-ethylidene-2-norbornene; etc. may be mentioned. Among these as well, 1,3-butadiene is preferable. These other monomers may be used alone respectively or as two types or more combined. In the polymer block (A), the ratio of content of the other monomer units is preferably 15 wt % or less, more preferably 10 wt % or less, still more preferably 6 wt % or less.

In the present invention, the polymer block (A) in the conjugated diene polymer chain is famed by polymerizing isoprene or a monomer mixture containing isoprene and an aromatic vinyl monomer in an inert solvent by using a polymerization initiator. The polymer block (A) which is famed has an active end.

The inert solvent used for polymerization of the isoprene or a monomer mixture containing isoprene and an aromatic vinyl monomer so as to form the polymer block (A) is not particularly limited so long as one which is usually used in solution polymerization and does not obstruct the polymerization reaction. As specific examples, for example, a chain aliphatic hydrocarbon such as butane, pentane, hexane, heptane, and 2-butene; an alicyclic hydrocarbon such as cyclopentane, cyclohexane, and cyclohexene; an aromatic hydrocarbon such as benzene, toluene, and xylene; etc. may be mentioned. The amount of use of the inert solvent is an amount giving a concentration of monomers of preferably 1 to 80 wt %, more preferably 10 to 50 wt %.

The polymerization initiator used for forming the polymer block (A) is not particularly limited so long as able to cause isoprene or a monomer mixture including isoprene and an aromatic vinyl monomer to polymerize to give a polymer chain having an active end. As specific example, an organic alkali metal compound, organic alkali earth metal compound, and a polymerization initiator having a lanthanum-series metal compound, etc. as a primary catalyst may be mentioned. As the organic alkali metal compound, for example, organic monolithium compounds such as n-butyllithium, sec-butyllithium, t-butyllithium, hexyllithium, phenyllithium, and stilbenelithium; organic polyvalent lithium compounds such as dilithiomethane, 1,4-dilithiobutane, 1,4-dilithio-2-ethylcyclohexane, 1,3,5-trilithiobenzene, and 1,3,5-tris(lithiomethyl)benzene; organic sodium compounds such as sodium naphthalene; organic potassium compounds such as potassium naphthalene; etc. may be mentioned. Further, as the organic alkali earth metal compound, for example, di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diketylbarium, etc. may be mentioned. As the polymerization initiator having a lanthanum-series metal compound as a primary catalyst, for example, a polymerization initiator having a salt of a lanthanum-series metal comprised of a lanthanum series metal such as lanthanum, cerium, praseodymium, neodymium, samarium, and gadolinium and a carboxylic acid, phosphorus-containing organic acid, etc. as a primary catalyst and comprised of this and a co-catalyst such as an alkylaluminum compound, organic aluminum hydride compound, and organic aluminum halide compound, etc. may be mentioned. Among these polymerization initiators, use of an organic monolithium compound is preferable, while use of n-butyllithium is more preferable. Note that, the organic alkali metal compound may also be reacted with a secondary amine such as dibutylamine, dihexylamine, dibenzylamine, pyrrolidine, hexamethyleneamide, and heptamethyleneimine in advance and used as an organic alkali metal amide compound. These polymerization initiators may be used respectively independently or as two types or more combined.

The amount of use of the polymerization initiator may be determined according to the targeted molecular weight, but is preferably 4 to 250 mmol with respect to 100 g of isoprene or a monomer mixture containing isoprene and an aromatic vinyl monomer, more preferably 6 to 200 mmol, particularly preferably 10 to 70 mmol in range.

The polymerization temperature in polymerization of isoprene or a monomer mixture including isoprene and an aromatic vinyl monomer is preferably −80 to +150° C., more preferably 0 to 100° C., still more preferably 20 to 90° C. in range. As the polymerization system, any system such as the batch system or continuous system can be employed. Further, the type of bond may, for example, be made various types of bonds such as a block type, taper type, and random type.

Further, in the method of production of the present invention, to adjust the content of vinyl bonds in the isoprene monomer units in the polymer block (A), at the time of polymerization, a polar compound is preferably added to the inert solvent. As the polar compound, an ether compound such as dibutyl ether, tetrahydrofuran, and 2,2-di(tetrahydrofuryl)propane; a tertiary amine such as tetramethylethylene diamine; an alkali metal alkoxide; a phosphine compound; etc. may be mentioned. Among these as well, an ether compound and tertiary amine are preferable, while among those as well, ones able to form a chelate structure with a metal of the polymerization initiator are more preferable, and 2,2-di(tetrahydrofuryl)propane and tetramethylethylene diamine are particularly preferable. The amount of the polar compound used may be determined in accordance with the targeted content of vinyl bonds. 0.01 to 30 moles per 1 mole of the polymerization initiator is preferable, while 0.05 to 10 moles is more preferable. If the amount of use of the polar compound is within the above range, adjustment of the content of vinyl bonds in the isoprene monomer units is easy. Further, trouble due to loss of activity of the polymerization initiator also does not easily occur. Further, by increasing the amount of use of the polar compound within the above range, it is possible to increase the content of vinyl bonds in the isoprene monomer units.

The content of vinyl bonds in the isoprene monomer units in the polymer block (A) is preferably 5 to 90 wt %, more preferably 5 to 80 wt %. By making the content of vinyl bonds in the isoprene monomer units within the above range, the obtained cross-linked rubber can be further improved in low heat buildup property and wet grip. Note that, in this Description, the "content of vinyl bonds in the isoprene monomer units" shall indicate the ratio of the total weight of the isoprene monomer units having a 1,2-structure and isoprene monomer units having a 3,4-structure in the isoprene monomer units.

The weight average molecular weight (Mw) of the polymer block (A), as a value converted to polystyrene measured by gel permeation chromatography, is preferably 500 to 15,000, more preferably 1,000 to 12,000, particularly preferably 1,500 to 10,000. If the weight average molecular weight of the polymer block (A) is within the above range, the obtained cross-linked rubber can be further improved in low heat buildup property and wet grip.

Further, the molecular weight distribution, represented by the ratio (Mw/Mn) between the weight average molecular weight (Mw) and number average molecular weight (Mn), of the polymer block (A) is preferably 1.0 to 1.5, more preferably 1.0 to 1.3. If the value (Mw/Mn) of the molecular weight distribution of the polymer block (A) is within the above range, production of the conjugated diene rubber becomes easier.

[Polymer Block (B)]

The polymer block (B) in the conjugated diene polymer chain according to the present invention is not particularly limited so long as a polymer block which contains 50 to 100 wt % of 1,3-butadiene monomer units and 0 to 50 wt % of aromatic vinyl monomer units in the polymer block (B), but preferably contains 55 to 95 wt % of 1,3-butadiene monomer units and 5 to 45 wt % of aromatic vinyl monomer units, more preferably contains 55 to 90 wt % of 1,3-butadiene monomer units and 10 to 45 wt % of aromatic vinyl monomer units. If the ratios of content of 1,3-butadiene monomer units and aromatic vinyl monomer units are within the above ranges, production of the conjugated diene rubber becomes easier.

As the aromatic vinyl monomer used for forming the aromatic vinyl monomer units contained in the polymer block (B), the aromatic vinyl monomers illustrated in the above-mentioned polymer block (A) can be similarly used. Among these as well, styrene is preferable.

The polymer block (B) is preferably comprised of only 1,3-butadiene monomer units or only 1,3-butadiene monomer units and aromatic vinyl monomer units, but may also contain, as desired in a range not detracting from the inherent properties in the present invention, other monomer units besides 1,3-butadiene monomer units and aromatic vinyl monomer units. As the other monomer used for forming the other monomer units, the same ones as the compounds illustrated for the above-mentioned polymer block (A) (however, excluding 1,3-butadiene) can be used. Further, in the polymer block (B), as the other monomer, isoprene can also be used. In the polymer block (B), the ratio of content of the other monomer units is preferably 50 wt % or less, more preferably 40 wt % or less, still more preferably 35 wt % or less.

In the present invention, the polymer block (B) in the conjugated diene polymer chain is famed as a continuation with a polymer block (A) by mixing the above-mentioned polymer block (A) having an active end and 1,3-butadiene or a monomer mixture containing 1,3-butadiene and an aromatic vinyl monomer to continue a polymerization reaction. The polymer block (B) famed become one having an active end.

The inert solvent used for polymerization of the polymer block (A) and 1,3-butadiene or a monomer mixture of 1,3-butadiene and an aromatic vinyl monomer for forming the polymer block (B) is not particularly limited. Ones similar to the inert solvent used for preparing the above-mentioned polymer block (A) can be used.

The amount of use of the polymer block (A) having an active end at the time of forming the polymer block (B) may be determined in accordance with the targeted molecular weight, but is preferably 0.1 to 5 mmol per 100 g of the 1,3-butadiene or a monomer mixture containing 1,3-butadiene and an aromatic vinyl monomer, more preferably 0.15 to 2 mmol, still more preferably 0.2 to 1.5 mmol in range.

The method of mixing the polymer block (A) and 1,3-butadiene or a monomer mixture containing 1,3-butadiene and an aromatic vinyl monomer is not particularly limited. It is possible to add the polymer block (A) having an active end into a solution of 1,3-butadiene or a monomer mixture containing 1,3-butadiene and an aromatic vinyl monomer or add 1,3-butadiene or a monomer mixture containing 1,3-butadiene and an aromatic vinyl monomer into a solution of the polymer block (A) having an active end. From the viewpoint of control of the polymerization, the method of adding the polymer block (A) having an active end to a solution of 1,3-butadiene or a monomer mixture containing 1,3-butadiene and an aromatic vinyl monomer is preferable.

The polymerization temperature in the polymerization of the 1,3-butadiene or a monomer mixture containing 1,3-butadiene and an aromatic vinyl monomer is preferably −80 to +150° C., more preferably 0 to 100° C., still more preferably 20 to 90° C. in range. As the polymerization system, any system such the batch system, continuous system, etc. may be employed. When making the polymer block (B) a copolymer chain, the batch system is preferable from the viewpoint of ease of control of the randomness of bonding.

The type of bonds of the monomers when making the polymer block (B) a copolymer chain may be made various types of bonds, for example, the block, taper, and random type. Among these as well, the random type is preferable. By making the bonds the random type, the obtained cross-linked rubber can be further improved in low heat buildup property. Note that, when making the bonds of the 1,3-butadiene and aromatic vinyl monomer random, it is preferable to continuously or intermittently supply 1,3-butadiene or 1,3-butadiene and an aromatic vinyl monomer into the polymerization system so that the ratio of the aromatic vinyl monomer with respect to the total of the 1,3-butadiene and aromatic vinyl monomer does not become too high.

Further, in the present invention, in order to adjust the content of vinyl bonds in the 1,3-butadiene monomer units in the polymer block (B), it is preferable to add a polar compound to an inert solvent at the time of polymerization in the same way as the time of adjustment of the content of vinyl bonds in the isoprene monomer units in the polymer block (A). However, if, at the time of preparation of the polymer block (A), adding a sufficient amount of the polar compound to the inert solvent to adjust the content of vinyl bonds in the 1,3-butadiene monomer units in the polymer block (B), a polar compound need not be newly added. Specific examples of the polar compound used for adjusting the content of vinyl bonds are similar to the polar compound used for preparing the above-mentioned polymer block (A). The amount of use of the polar compound may be determined in accordance with the targeted content of vinyl bonds. It may be adjusted to preferably 0.01 to 100 moles with respect to 1 mole of the polymerization initiator, more preferably 0.1 to 30 moles in range. If the amount of use of the polar compound is in this range, adjustment of the content of vinyl bonds in the 1,3-butadiene monomer units is easy and the trouble due to loss of activity of the polymerization initiator also does not easily occur.

The content of vinyl bonds in the 1,3-butadiene monomer units in the polymer block (B) is preferably 10 to 90 wt %, more preferably 20 to 80 wt %, particularly preferably 25 to 70 wt %. By making the content of vinyl bonds in the 1,3-butadiene monomer units in the polymer block (B) within the above range, the obtained cross-linked rubber becomes more excellent in low heat buildup property.

By doing this, it is possible to obtain a conjugated diene polymer chain having an active end and containing a polymer block (A) and a polymer block (B). In the present invention, from the viewpoint of productivity, the conjugated diene polymer chain having an active end is preferably comprised of the "polymer block (A)-polymer block (B)" where the end of the polymer block (B) is the active end. But the conjugated diene polymer chain may also have a plurality of polymer blocks (A) and may also have another polymer block. For example, a "polymer block (A)-polymer block (B)-polymer block (A)" or other conjugated diene polymer chain having an active end may be mentioned. When foiling the polymer block (A) at the active end side of the conjugated diene polymer chain, the amount of isoprene used is preferably 10 to 100 moles with respect to 1 mole of the polymerization initiator used for the first polymerization reaction (polymerization reaction for forming first polymer block (A)), more preferably 15 to 70 mol, particularly preferably 20 to 35 moles.

In the conjugated diene polymer chain having an active end obtained in the present invention, the weight ratio of the polymer block (A) and polymer block (B) (when there are pluralities of the polymer blocks (A) and polymer blocks (B) present, the weight ratio based on their respective total weights) is, by (weight of polymer block (A))/(weight of polymer block (B)), preferably 0.001 to 0.1, more preferably 0.003 to 0.07, particularly preferably 0.005 to 0.05. By making the weight ratio of the polymer block (A) and polymer block (B) within the above range, the obtained cross-linked rubber can be made one good in balance of low heat buildup property and wet grip.

In the conjugated diene polymer chain having an active end obtained in the present invention, the weight average molecular weight (Mw), by value converted to polystyrene measured by gel permeation chromatography, is preferably 100,000 to 1,000,000, more preferably 150,000 to 700,000, still more preferably 150,000 to 500,000. By making the weight average molecular weight (Mw) of the conjugated diene polymer chain having an active end within the above range, the obtained cross-linked rubber can be made one with a good balance of low heat buildup property and wet grip.

In the conjugated diene polymer chain having an active end, the molecular weight distribution, expressed by the ratio (Mw/Mn) between the weight average molecular weight (Mw) and number average molecular weight (Mn), is preferably 1.0 to 3.0, more preferably 1.0 to 2.5, particularly preferably 1.0 to 2.2. If the molecular weight distribution (Mw/Mn) of the conjugated diene polymer chain having an active end is within the above range, production of the conjugated diene rubber becomes easy.

In the conjugated diene polymer chain having an active end, the ratio of contents of the total monomer units of the isoprene monomer units and 1,3-butadiene monomer units and the aromatic vinyl monomer units is preferably 50 to 100 wt % of the total monomer units of isoprene monomer units and 1,3-butadiene monomer units in the conjugated diene polymer chain having an active end and 0 to 50 wt % of aromatic vinyl monomer units, more preferably 55 to 95 wt % of the total monomer units of isoprene monomer units and 1,3-butadiene monomer units and 5 to 45 wt % of aromatic vinyl monomer units, particularly preferably 55 to 90 wt % of the total monomer units of the isoprene monomer units and 1,3-butadiene monomer units and 10 to 45 wt % of aromatic vinyl monomer units. Further, in the conjugated diene polymer chain having an active end, the content of vinyl bonds in the isoprene monomer units and the 1,3-butadiene monomer units is preferably the same range as the content of vinyl bonds in the 1,3-butadiene monomer units in the polymer block (B).

<Conjugated Diene Rubber>

In the method of production of a conjugated diene rubber of the present invention, after the above-mentioned steps, by performing a step of reacting a compound represented by the following general formula (1) with the active end of the above-mentioned conjugated diene polymer chain having an active end, a conjugated diene rubber is obtained.

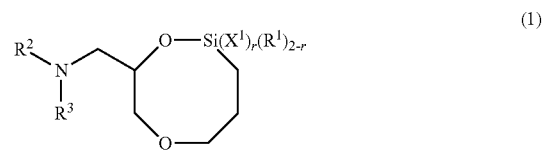

In the general formula (1), $X^2$ represents a functional group selected from a hydrocarbyloxy group, halogen group, and hydroxyl group, $R^2$ represents a substituted or unsubstituted hydrocarbon group, each of $R^2$ and $R^3$ independently represents a substituted or unsubstituted hydrocarbon group, $R^2$ and $R^3$ may bond with each other to form a ring structure together with the nitrogen atom represented by "N" in the general formula (1), and, when forming the ring structure, $R^2$ and $R^3$ may form a ring structure together with a hetero atom other than the nitrogen atom represented by the "N" in addition to the nitrogen atom represented by the "N", "r" is an integer of 0 to 2.

In the general formula (1), $X^1$ represents a functional group selected from a hydrocarbyloxy group, halogen group, and hydroxyl group. The hydrocarbyloxy group which may form the functional group represented by $X^1$ is not particularly limited, but an alkoxy group such as a methoxy group, ethoxy group, n-propoxy group, isopropoxy group, n-butoxy group, isobutoxy group, sec-butoxy group, and tert-butoxy group; an alkenyloxy group such as a vinyloxy group and allyloxy group; an aryloxy group such as a phenoxy group and naphthoxy group; an aralkyloxy group such as a benzyloxy group; etc. may be mentioned. Among these, an alkoxy group or aryloxy group is preferable, an alkoxy group is more preferable, and a methoxy group or ethoxy group is particularly preferable. Further, the halogen group which may form $X^1$ is not particularly limited, but a fluoro group, chloro group, bromo group, and iodo group may be mentioned. Among these, a chloro group is preferable. Further, $X^1$ may also be a hydroxyl group. Such a hydroxyl group may be a hydroxyl group obtained by hydrolyzing a hydrocarbyloxy group or halogen group.

Further, in the general formula (1), "r" (that is, the number of functional groups represented by $X^1$ in formula (1)) is an integer of 0 to 2, preferably 1 or 2. When "r" is 2 in the general formula (1), the two groups represented by $X^1$ which are contained in one molecule of the compound represented by the general formula (1) may be the same or may be different from each other.

In the general formula (1), $R^1$ represents a substituted or unsubstituted hydrocarbon group. The hydrocarbon group which may form $R^1$ is not particularly limited, but an alkyl group such as a methyl group, ethyl group, n-propyl group, isopropyl group, n-butyl group, isobutyl group, sec-butyl group, and tert-butyl group; an alkenyl group such as a vinyl group and allyl group; an alkynyl group such as an ethynyl group and propinyl group; a aryl group such as a phenyl group and naphthyl group; an aralkyl group such as a benzyl group; etc. may be mentioned. Among these, an alkyl group or aryl group is preferable, while an alkyl group is more preferable. Further, the hydrocarbon group represented by $R^1$ may have a substituent other than a hydrocarbon group. The substituent is not particularly limited, but a carbonyl group-containing group such as a carboxyl group, acid anhydride group, hydrocarbylcarbonyl group, alkoxycarbonyl group, and acyloxy group or an epoxy group, oxy group, cyano group, amino group, halogen group, etc. may be mentioned. Note that, when "r" in the general formula (1) is 0, the two groups represented by $R^1$ contained in the molecule of the compound represented by the general formula (1) may be the same or different from each other.

In the general formula (1), each of $R^2$ and $R^3$ independently represents a substituted or unsubstituted hydrocarbon group. $R^2$ and $R^3$ may bond with each other and form a ring structure together with the nitrogen atom represented by "N" in the general formula (1). When forming the ring structure, it is also possible to form a ring structure together with a hetero atom other than the nitrogen atom represented by "N" in the general formula (1) in addition to the nitrogen atom represented by "N" in the general formula (1). When $R^2$ and $R^3$ are not bonded with each other, the hydrocarbon group which may form $R^2$ and $R^3$ are not particularly limited, but an alkyl group such as a methyl group, ethyl group, n-propyl group, isopropyl group, n-butyl group, isobutyl group, sec-butyl group, and tert-butyl group; an alkenyl group such as a vinyl group and allyl group; an alkynyl group such as an ethynyl group and propinyl group; an aryl group such as a phenyl group and naphthyl group; an aralkyl group such as a benzyl group; etc. may be mentioned. Among these, an alkyl group or aryl group is preferable, an alkyl group is more preferable, and a methyl group or ethyl group is particularly preferable. Further, when $R^2$ and $R^3$ bond with each other and form a ring structure together with the nitrogen atom represented by "N" in the general formula (1), the bivalent hydrocarbon group comprised of $R^2$ and $R^3$ bonded together is not particularly limited, but an n-butylene group (when forming 1-pyrrolidine group together with nitrogen atom represented by "N" in the general formula (1)), an n-pentylene group (when forming a 1-piperidine group), a butadienylene group (when forming a 1-pyrole group), etc. may be mentioned.

Further, the hydrocarbon group represented by $R^2$ and $R^3$ may have a substituent other than hydrocarbon group regardless of whether forming a ring structure. The substituent is not particularly limited, but a carbonyl-group containing group such as a carboxyl group, acid anhydride group, hydrocarbylcarbonyl group, alkoxycarbonyl group, and acyloxy group or an epoxy group, oxy group, cyano group, amino group, halogen group, etc. may be mentioned. Furthermore, when $R^2$ and $R^3$ bond with each other and form a ring structure together with the nitrogen atom represented by the "N" in the general formula (1), the atoms forming the ring structure may include a hetero atom other than carbon atoms and the nitrogen atom represented by the "N" in the general formula (1). As examples of such hetero atoms, nitrogen atom and oxygen atom may be mentioned.

In the present invention, among the compound represented by the general formula (1), as a particularly preferable one, one where the hydrocarbon group represented by $R^2$ and $R^3$ bond with each other to form a piperazine ring structure together with the nitrogen atom represented by the "N" in the general formula (1) may be mentioned. More specifically, it is preferable to use a compound represented by the following general formula (3). By using a compound represented by the following general formula (3), it is possible to make the obtained cross-linked rubber particularly excellent in low heat buildup property.

In the general formula (3), $X^1$, $R^1$, and "r" are all same as the general formula (1), while $R^5$ represents a hydrocarbon group.

In the general formula (3), $R^5$ represents a hydrocarbon group. The hydrocarbon group which may form $R^5$ is not particularly limited, but an alkyl group such as a methyl group, ethyl group, n-propyl group, isopropyl group, n-butyl group, isobutyl group, sec-butyl group, and tert-butyl group; an alkenyl group such as a vinyl group and allyl group; an alkynyl group such as an ethynyl group and propinyl group; an aryl group such as a phenyl group and naphthyl group; an aralkyl group such as a benzyl group; etc. may be mentioned. Among these, an alkyl group or aryl group is preferable, an alkyl group is more preferable, and a methyl group is particularly preferable.

As specific examples of the compound represented by the formula (1), 2,2-dimethoxy-8-(4-methylpiperazinyl)methyl-1,6-dioxa-2-silacyclooctane, 2,2-diethoxy-8-(4-methylpiperazinyl)methyl-1,6-dioxa-2-silacyclooctane, 2,2-dimethoxy-8-(N,N-diethyl)methyl-1,6-dioxa-2-silacyclooctane, 2-methoxy-2-methyl-8-(4-methylpiperazinyl)methyl-1,6-dioxa-2-silacyclooctane etc. may be mentioned. These compounds represented by the general formula (1) may be used as single types independently or as two types or more combined.

In the method of production of a conjugated diene rubber of the present invention, the amount of use of the compound represented by the general formula (1) is not particularly limited, but an amount of a compound represented by the general formula (1) with respect to 1 mole of the active end of the conjugated diene polymer chain having an active end to be reacted with is preferably 0.5 to 10.0 moles, more preferably 0.7 to 5.0 moles, particularly preferably 1.0 to 2.0 moles. By using a compound represented by the general formula (1) in such an amount, the obtained conjugated diene rubber can become one giving a cross-linked rubber particular excellent in low heat buildup property.

Note that, usually, the compound represented by the general formula (1) is considered to proceed in reaction in the following way when reacted with an active end of a conjugated diene polymer chain. That is, first, as a first stage reaction, the oxygen-silicon bond in the 8-member ring structure in the compound represented by the general formula (1) is cleaved, the silicon atom forms a new bond with an active end of the conjugated diene polymer chain, and the oxygen atom foils a salt structure with the counter ions of the active end (note that, the salt structure will react with the proton derived from the polymerization reaction terminator etc. at the time of stopping the polymerization reaction to form a hydroxyl group). Furthermore, when the compound represented by the general formula (1) has a hydrocarbyloxysilyl group (when "r" in the general formula (1) is 1 or 2), the hydrocarbyloxy group of the hydrocarbyloxysilyl group and an active end of the conjugated diene polymer chain react and, furthermore, a bond is famed between the silicon atom and an active end of the conjugated diene polymer chain. Then, the conjugated diene rubber obtained by such a reaction can be made one having a structure represented by the following general formula (4).

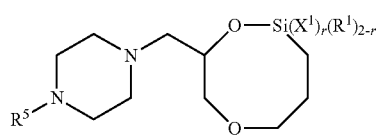

(3)

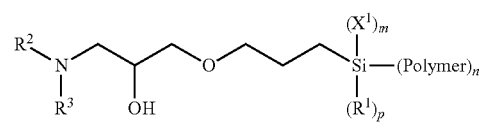

(4)

In the above general formula (4), "polymer" represents a conjugated diene polymer chain. $X^1$, $R^1$, $R^2$, and $R^3$ are all same as the above general formula (1). Further, "n" is an integer of 1 to 3, "m" is an integer of 0 to 2, "p" is an integer of 0 to 2, and n+m+p=3.

The method of reacting the compound represented by the general formula (1) and the conjugated diene polymer chain having an active end is not particularly limited, but the method of mixing these in a solvent able to dissolve them etc. may be mentioned. As the solvent used at this time, it is possible to use ones illustrated as inert solvents used for polymerization for forming the above-mentioned polymer block (A) and polymer block (B). Further, at this time, the method of adding the compound represented by the general formula (1) to the polymerization solution used for the polymerization for obtaining conjugated diene polymer chain having an active end is simple and preferable. Further, at this time, the compound represented by the general formula (1) is preferably dissolved in an inert solvent and then added to the polymerization system. The concentration of the solution is preferably made 1 to 50 wt % in range. The reaction temperature is not particularly limited, but is usually 0 to 120° C. The reaction time is also not particularly limited, but is usually 1 minute to 1 hour.

The timing for adding the compound represented by the above general formula (1) to the solution containing the conjugated diene polymer chain having an active end is not particularly limited, but it is preferable to add the compound represented by the general formula (1) to this solution in the state where the polymerization reaction at the conjugated diene polymer chain having an active end is not completed and the solution containing the conjugated diene polymer chain having an active end also contains a monomer, more specifically, in the state where the solution containing conjugated diene polymer chain having an active end contains 100 ppm or more of monomer, more preferably 300 to 50,000 ppm of monomer. By adding the compound represented by the general formula (1) in this way, it becomes possible to suppress secondary reactions between the conjugated diene polymer chain having an active end and impurities etc. contained in the polymerization system and to control the reaction well.

Further, in the method of production of the present invention, in a state after obtaining the conjugated diene polymer chain having an active end and containing a polymer block (A) and a polymer block (B) and before reacting a compound represented by the general formula (1) with the conjugated diene polymer chain having an active end or in a state after reacting the compound represented by the general formula (1) and where the conjugated diene polymer chain having an active end remains, a step of reacting part of the active ends of the conjugated diene polymer chain having an active end with tin halide, silicon halide, or a compound represented by the general formula (2) is preferably further provided. Note that, the tin halide, silicon halide, and compound represented by the following general formula (2) act as coupling agents by reacting with the active end of the conjugated diene polymer chain having an active end. Further, due to this, it is possible to introduce a branched structure (preferably a branched structure having three or more branches) in the obtained conjugated diene rubber and possible to further raise the shape stability of the conjugated diene rubber.

(2)

In the general formula (2), $R^4$ represents a substituted or unsubstituted bivalent hydrocarbon group, $X^2$ represents a halogen group, and M represents a silicon atom or tin atom.

As the tin halide, tin tetrachloride, triphenylmonochlorotin, etc. may be mentioned. Tin tetrachloride is preferable. Further, as the silicon halide, silicon tetrachloride, hexachlorodisilane, triphenoxychlorosilane, methyltriphenoxysilane, diphenoxydichlorosilane, etc. may be mentioned. Silicon tetrachloride is preferable.

Further, in the general formula (2), $R^4$ represents a substituted or unsubstituted bivalent hydrocarbon group. The bivalent hydrocarbon group which may form $R^4$ is not particularly limited, but a methylene group, 1,2-ethylene group, 1,3-propylene group, 1,4-butylene group, 1,5-pentylene group, 1,6-hexylene group, 4-methyl-2,2-pentylene group, 2,3-dimethyl-2,3-butylene group, etc. may be mentioned. Among these, 1,2-ethylene group and 1,6-hexylene group are preferable. Further, the halogen group which may form $X^2$ is not particularly limited, but a fluoro group, chloro group, bromo group, and iodo group may be mentioned. Among these, a chloro group is preferable. Furthermore, M is a silicon atom or tin atom, but a silicon atom is preferable.

Further, as specific examples of the compound represented by the above general formula (2), bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl)hexane, etc. may be mentioned.

In the method of production of a conjugated diene rubber of the present invention, the amount of use of the tin halide, silicon halide, or compound represented by the general formula (2) is not particularly limited, but an amount of these with respect to 1 mole of the active end of the conjugated diene polymer chain having an active end to be reacted with is preferably 0.001 to 0.2 mole, more preferably 0.005 to 0.1 mole, particularly preferably 0.01 to 0.05 mole. By using the tin halide, silicon halide, or compound represented by the above general formula (2) in such an amount, the obtained conjugated diene rubber can be further improved in shape stability.

The method of reacting part of such active ends of the conjugated diene polymer chain having an active end with the tin halide, silicon halide, or compound represented by the above general formula (2) is not particularly limited, but the method of mixing these in a solvent able to dissolve them etc. may be mentioned. As the solvent used at this time, ones illustrated as the inert solvent used for the polymerization for forming the above-mentioned polymer block (A) and polymer block (B) may be used. Further, at that time, the method of adding tin halide, silicon halide, or a compound represented by the above general formula (2) to the polymerization solution for obtaining the conjugated diene polymer chain having an active end is simple and preferable. Further, at this time, the tin halide, silicon halide, or compound represented by the above general formula (2) is preferably dissolved in an inert solvent and added to the polymerization system. The concentration of the solution is preferably 1 to 50 wt % in range. The reaction temperature is not particularly limited, but is usually 0 to 120° C. The reaction time is also not particularly limited, but is usually 1 minute to 1 hour.

Further, the timing of adding the tin halide, silicon halide, or compound represented by the above general formula (2) to the solution containing the conjugated diene polymer chain having an active end, in the same way as the compound represented by the above general formula (1), is preferably addition in a state where the polymerization reaction at the conjugated diene polymer chain having an active end is not completed and the solution containing the conjugated diene polymer chain having an active end also contains a monomer.

The conjugated diene rubber of the present invention is not particularly limited in coupling rate, but is preferably 10 wt % or more, more preferably 15 wt % or more, particularly preferably 20 wt % or more, further preferably 80 wt % or less, more preferably 75 wt % or less, particularly preferably 70 wt % or less. If this coupling rate is too low, the cross-linked rubber obtained from the conjugated diene rubber is liable to become insufficient in mechanical strength. Further, if the coupling rate is too high, the cross-linked rubber obtained from the conjugated diene rubber is liable to become insufficient in abrasion resistance. Note that, the coupling rate is the weight percentage of the polymer molecules having a molecular weight of 1.8 times or more of the peak top molecular weight of the conjugated diene polymer chain having an active end before reaction with the compound represented by the above general formula (1) and, if desired, the tin halide, silicon halide, or compound represented by the general formula (2) to the total amount of the finally obtained conjugated diene rubber. The molecular weight at this time is measured by finding the molecular weight converted to polystyrene by gel permeation chromatography.

After reaction with the compound represented by the above general formula (1) and, if desired, the tin halide, silicon halide, or compound represented by the general formula (2) with the active end of the conjugated diene polymer chain, an alcohol such as methanol, ethanol, and isopropanol or water as a polymerization terminator is preferably added to the polymerization solution to deactivate the unreacted active end.

After deactivating the active end of the conjugated diene polymer chain, if desired, an antioxidant such as a phenol-based stabilizer, phosphorus-based stabilizer, and sulfur-based stabilizer, a crumb forming agent, scale preventing agent, etc. are added to the polymerization solution, then direct drying or steam stripping etc. is used to separate the polymerization solvent from the polymerization solution to recover the conjugated diene rubber obtained by the method of production of the present invention. Note that, before separating the polymerization solvent from the polymerization solution, it is also possible to mix an extension oil in the polymerization solution and recover the conjugated diene rubber as oil extended rubber.

As the extension oil used when recovering the conjugated diene rubber as an oil extended rubber, for example, a paraffin-based, aromatic-based, and naphthene-based petroleum-based softening agent, plant-based softening agent, fatty acid, etc. may be mentioned. If using a petroleum-based softening agent, the content of polycyclic aromatic compound extracted by the method of IP346 (test method of THE INSTITUTE PETROLEUM of the U.K.) is preferably less than 3%. When using an extension oil, the amount of use is preferably 5 to 100 parts by weight with respect to 100 parts by weight of the conjugated diene rubber, more preferably 10 to 60 parts by weight, still more preferably 20 to 50 parts by weight.

In the conjugated diene rubber obtained by the method of production of the present invention, the weight average molecular weight (Mw) is, by value measured by gel permeation chromatography converted to polystyrene, preferably 100,000 to 3,000,000, more preferably 150,000 to 2,000,000, particularly preferably 200,000 to 1,5000,000. By making the weight average molecular weight of the conjugated diene rubber within the above range, mixing the silica into the conjugated diene rubber becomes easy, the processability of the rubber composition becomes excellent, and the obtained cross-linked rubber can be further improved in low heat buildup property.

In the conjugated diene rubber obtained by the method of production of the present invention, the molecular weight distribution, expressed by the ratio (Mw/Mn) between the weight average molecular weight (Mw) and number average molecular weight (Mn), is preferably 1.1 to 3.0, more preferably 1.2 to 2.5, particularly preferably 1.2 to 2.2. By making the molecular weight distribution (Mw/Mn) of the conjugated diene rubber within the above range, it is possible to better improve the low heat buildup property of the obtained cross-linked rubber.

Further, in the conjugated diene rubber obtained by the method of production of the present invention, the Mooney viscosity ($ML_{1+4}$, 100° C.) is preferably 20 to 100, more preferably 30 to 90, particularly preferably 35 to 80. Note that, when making the conjugated diene rubber an oil extended rubber, it is preferable to make the Mooney viscosity of the oil extended rubber the above range.

The conjugated diene rubber obtained by the method of production of the present invention in this way is excellent in shape stability. Further, it is possible to add a compounding agent such as a filler and cross-linking agent and use the result suitably for various applications. In particular, when mixing in silica as a filler, it is possible to give a rubber composition suitably used for obtaining cross-linked rubber excellent in low heat buildup property and wet grip.

<Rubber Composition>

The rubber composition of the present invention is a composition containing 10 to 200 parts by weight of silica with respect to 100 parts by weight of a rubber component containing the conjugated diene rubber obtained by the above-mentioned method of production of the present invention.

As the silica used in the present invention, for example, dry white carbon, wet white carbon, colloidal silica, precipitated silica, etc. may be mentioned. Among these as well, wet white carbon mainly comprised of hydrous silicic acid is preferable. Further, a carbon-silica dual phase filler comprised of carbon black on the surface of which silica is carried may be used. These silica can be used respectively independently or as two or more types combined. The nitrogen adsorption specific surface area of the silica which is used (measured by BET method based on ASTM D3037-81) is preferably 50 to 300 $m^2/g$, more preferably 80 to 220 $m^2/g$, particularly preferably 100 to 170 $m^2/g$. Further, the pH of the silica is preferably 5 to 10.

In the rubber composition of the present invention, the content of the silica is 10 to 200 parts by weight with respect to 100 parts by weight of the rubber component in the rubber composition, preferably 30 to 150 parts by weight, more preferably 50 to 100 parts by weight. By making the amount of silica the above range, the processability of the rubber composition becomes excellent and the wet grip of the obtained cross-linked rubber can be further improved.

The rubber composition of the present invention may further contain a silane coupling agent from the viewpoint of further improvement of low heat buildup property. As the silane coupling agent, for example, vinyltriethoxysilane, β-(3,4-epoxycyclohexyl)ethyltrimethoxysilane, N-(β-aminoethyl)-γ-aminopropyltrimethoxysilane, 3-octathio-1-propyl-triethoxysilane, bis(3-(triethoxysilyl)propyl) disulfide, bis(3-(triethoxysilyl)propyl) tetrasulfide, γ-trimethoxysilylpropyldimethylthiocarbamyl tetrasulfide, γ-trimethoxysilylpropylbenzothiazyl tetrasulfide, etc. may be mentioned. These silane coupling agents can be used respectively independently or as two or more types combined. The amount of the silane coupling agent is preferably 0.1 to 30 parts by weight with respect to 100 parts by weight of the silica, more preferably 1 to 15 parts by weight.

Further, the rubber composition of the present invention may further contain carbon black such as furnace black, acetylene black, thermal black, channel black, and graphite. Among these as well, furnace black is preferable. These carbon black can be used respectively independently or as two or more types combined. The amount of the carbon black is usually 120 parts by weight or less with respect to 100 parts by weight of the rubber component in the rubber composition.

Note that, the method of adding silica to the rubber component containing the conjugated diene rubber obtained by the method of production of the present invention is not particularly limited, but the method of adding it to a solid rubber component and kneading it (dry kneading method) or the method of adding it to a solution containing the conjugated diene rubber and coagulating and drying it (wet kneading method) etc. can be applied.

Further, the rubber composition of the present invention preferably further contains a cross-linking agent. As the cross-linking agent, for example, sulfur, sulfur halide, organoperoxide, quinone dioximes, organic polyvalent amine compound, alkylphenol resin having a methylol group, etc. may be mentioned. Among these as well, sulfur is preferably used. The amount of the cross-linking agent is preferably 0.1 to 15 parts by weight with respect to 100 parts by weight of the rubber component in the rubber composition, more preferably 0.5 to 5 parts by weight, particularly preferably 1 to 4 parts by weight.

Further, the rubber composition of the present invention may have mixed with it, other than the above ingredients, in accordance with ordinary methods, compounding ingredients such as a cross-linking accelerator, cross-linking activator, antioxidant, filler (except the above-mentioned silica and carbon black), activating agent, process oil, plasticizer, slip agent, and tackifier in respectively required amounts.

When using sulfur or a sulfur-containing compound as a cross-linking agent, jointly using a cross-linking accelerator and cross-linking activator is preferable. As the cross-linking accelerator, for example, a sulfenamide-based cross-linking accelerator; guanidine-based cross-linking accelerator; thiourea-based cross-linking accelerator; thiazole-based cross-linking accelerator; thiuram-based cross-linking accelerator; dithiocarbamic acid-based cross-linking accelerator; xanthic acid-based cross-linking accelerator; etc. may be mentioned. Among these as well, one including a sulfenamide-based cross-linking accelerator is preferable. These cross-linking accelerators may be used respectively alone or as two or more types combined. The amount of cross-linking accelerator is preferably 0.1 to 15 parts by weight with respect to 100 parts by weight of the rubber component in the rubber composition, more preferably 0.5 to 5 parts by weight, particularly preferably 1 to 4 parts by weight.

As the cross-linking activator, for example, higher fatty acids such as stearic acid; zinc oxide; etc. may be mentioned. These cross-linking activators may be used respectively alone or as two types or more combined. The amount of the cross-linking activator is preferably 0.05 to 20 parts by weight with respect to 100 parts by weight of the rubber component in the rubber composition, particularly preferably 0.5 to 15 parts by weight.

Further, the rubber composition of the present invention may contain other rubber besides the conjugated diene rubber obtained by the above-mentioned method of production of the present invention. As the other rubber, for example, rubber other than the conjugated diene rubber obtained by the above-mentioned method of production of the present invention such as natural rubber, polyisoprene rubber, emulsion polymerized styrene-butadiene copolymer rubber, solution polymerized styrene-butadiene copolymer rubber, polybutadiene rubber (high cis-BR or low cis BR. Further, polybutadiene rubber containing crystal fibers made of 1,2-polybutadiene polymer also possible), styrene-isoprene copolymer rubber, butadiene-isoprene copolymer rubber, styrene-isoprene-butadiene copolymer rubber, acrylonitrile-butadiene copolymer rubber, and acrylonitrile-styrene-butadiene copolymer rubber may be mentioned. Among these as well, natural rubber, polyisoprene rubber, polybutadiene rubber, and solution polymerized styrene-butadiene copolymer rubber are preferable. These rubbers can be used respectively independently or as two or more types combined.

In the rubber composition of the present invention, the conjugated diene rubber obtained by the method of production of the present invention preferably accounts for 10 to 100 wt % of the rubber component in the rubber composition, particularly preferably 50 to 100 wt %. By including the conjugated diene rubber of the present invention in the rubber component in such a ratio, a cross-linked rubber improved in wet grip can be obtained.

To obtain the rubber composition of the present invention, it is sufficient to knead the ingredients according to an ordinary method. For example, it is possible to knead the ingredients other than thermally unstable ingredients such as cross-linking agent and cross-linking accelerator with the conjugated diene rubber, then mix thermally unstable ingredients such as cross-linking agent and cross-linking accelerator with the kneaded material to obtain the target rubber composition. The kneading temperature of the ingredients other than the thermally unstable ingredients and the conjugated diene rubber is preferably 80 to 200° C., more preferably 120 to 180° C., while the kneading time is preferably 30 seconds to 30 minutes. Further, the kneaded material and thermally unstable ingredients are mixed after cooling them down to usually 100° C. or less, preferably 80° C. or less.

Further, the rubber composition of the present invention can, for example, be cross-linked and used as a tire and, in addition, can be used as resin reinforcing rubber such as impact resistant polystyrene.

<Cross-Linked Rubber>

The cross-linked rubber of the present invention is obtained by cross-linking the above-mentioned rubber composition of the present invention.

The cross-linked rubber of the present invention can be produced by using the rubber composition of the present invention, shaping it, for example, by a molding machine corresponding to the desired shape, for example, an extruder, injection molding machine, press, rolls, etc., heating it to cause a cross-linking reaction and fixing the shape as a cross-linked product. In this case, the rubber composition may be cross-linked after shaping it in advance or may be cross-linked simultaneously with shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 12 hours, particularly preferably 3 minutes to 6 hours.

Further, depending on the shape, size, etc. of the cross-linked rubber, sometimes even if the surface is cross-linked, the inside may not be sufficiently cross-linked, so the rubber may be further heated for secondary cross-linking.

As the heating method, a general method used for cross-linking rubber such as press heating, steam heating, oven heating, and hot air heating may be suitably selected.

The cross-linked rubber of the present invention obtained in this way is obtained using the conjugated diene rubber obtained by the above-mentioned method of production of the present invention, so is excellent in low heat buildup property and wet grip. Further, making use of such characteristics, the cross-linked rubber of the present invention can be used for example for various applications such as, in tires, the materials of various tire parts such as the cap tread, base tread, carcass, side walls, and beads; the materials of various industrial products such as hoses, belts, mats, and shock absorbing rubber; agents for improving the impact resistance of resins; resin film cushioning; shoe soles; rubber shoes; golf balls; and toys. In particular, the cross-linked rubber of the present invention can be suitably used for various parts of tires such as treads, carcasses, side walls, and beads in various types of tires such as all season tires, high performance tires, and studless tires and in particular is excellent in low heat buildup property, so can be suitably used as tread of a low fuel consumption tire.

EXAMPLES

Below, the present invention will be explained based on more detailed examples, but the present invention is not limited to these examples. Note that, in the examples, "parts" and "%" are based on weight unless otherwise indicated. Further, the tests and evaluations were performed in accordance with the following descriptions.

[Weight Average Molecular Weight, Molecular Weight Distribution, and Coupling Rate]

The weight average molecular weight (Mw), molecular weight distribution (Mw/Mn), and coupling rate were found by obtaining charts based on the molecular weight converted to polystyrene by gel permeation chromatography and using the obtained chart. The specific measurement conditions of the gel permeation chromatography were as follows:

Measuring device: high performance liquid chromatograph (made by Tosoh, product name "HLC-8220")

Column: two columns made by Tosoh, product name "GMH-HR-H", connected in series.

Detector: differential refractometer

Eluent: tetrahydrofuran

Column temperature: 40° C.

Note that, for the coupling rate, in an elution curve obtained by a gel permeation chromatography under the above conditions, the area ratio of peak parts having a peak top molecular weight of 1.8 times or more of the peak top molecular weight shown by a peak of the smallest molecular weight to the total elution area was made the value of the coupling rate of the conjugated diene polymer chain.

[Aromatic Vinyl Monomer Unit Content and Content of Vinyl Bonds]

The aromatic vinyl monomer unit content and content of vinyl bonds were measured by $^1$H-NMR.

[Shape Stability of Conjugated Diene Rubber]

The conjugated diene polymer is famed into a thickness 2 mm sheet shape, then was punched to a dumbbell no. 8 shape prescribed by JIS K6251. At the center part of this dumbbell shaped test piece, two mark lines were drawn to give a distance between mark lines of 10 mm. Next, one of the grip parts of the test piece was fixed and the piece hung down. This was allowed to stand at a temperature 23° C. and humidity 50% for 96 hours. The distance between the mark lines was found after standing and was used as the value of the shape stability. This value of the shape stability was shown by an indexed value with respect to the measured value of Comparative Example 1 as 100. The smaller this index, the better the shape stability.

[Low Heat Buildup Property of Cross-Linked Rubber]

The low heat buildup property was evaluated by measuring a test piece of a length 50 mm, width 12.7 mm, and thickness 2 mm for the value of tan δ at 60° C. using an ARES made by Rheometrics under conditions of a dynamic stress of 2.5% and 10 Hz. The value of this tan δ was shown by an indexed value with respect to the measured value of Comparative Example 1 as 100. The smaller this index, the better the low heat buildup property.

[Wet Grip of Cross-Linked Rubber]

The wet grip was evaluated by measuring a test piece of a length 50 mm, width 12.7 mm, and thickness 2 mm for the value of tan δ at 0° C. using an ARES made by Rheometrics under conditions of a dynamic stress of 0.5% and 10 Hz. The value of this tan δ was shown by an indexed value with respect to the measured value of Comparative Example 1 as 100. The larger this index, the better the wet grip.

Example 1

To a nitrogen-substituted 100 ml vial, 49.6 g of cyclohexane and 0.56 mmol of tetramethylethylenediamine were added and furthermore 5.6 mmol of n-butyllithium was added. Next, 11.48 g of isoprene and 0.93 g of styrene were slowly added and made to react in the vial at 50° C. for 120 minutes to thereby obtain polymer block (A) having an active end. The polymer block (A) had a weight average molecular weight (Mw) of 3700, a molecular weight distribution (Mw/Mn) of 1.09, an aromatic vinyl monomer unit content of 7.5%, an isoprene monomer unit content of 92.5%, and a content of vinyl bonds of 8.1%.

Next, to an autoclave equipped with a stirrer, in a nitrogen atmosphere, 4000 g of cyclohexane, 8.1 mmol of tetramethylethylenediamine, 440.4 g of 1,3-butadiene, and 159.6 g of styrene were charged, then the entire amount of the above obtained polymer block (A) having an active end was added and polymerization was started at 40° C. After the elapse of 10 minutes from the start of polymerization, 350.0 g of 1,3-butadiene and 50.0 g of styrene were continuously added over 60 minutes. The maximum temperature during the polymerization reaction was 60° C. After the end of continuous addition, the polymerization reaction was continued for a further 20 minutes. After it was confirmed that the polymerization conversion rate reached 95% to 100% in range, 0.16 mmol of 1,6-bis(trichlorosilyl)hexane was added and a reaction was performed for 10 minutes. Next, 8.06 mmol of 2,2-dimethoxy-8-(4-methylpiperazinyl) methyl-1, 6-dioxa-2-silacyclooctane (compound of the general formula (3) where $X^1$=OCH$_3$, r=2, and $R^5$=CH$_3$) was added and a reaction was performed for 30 minutes. After that, as a polymerization terminator, an amount of methanol corresponding to 2 moles of the n-butyllithium used was added to obtain a solution containing a conjugated diene rubber. To this solution, as an antioxidant, 0.15 part of Irganox 1520L (made by Ciba Specialty Chemicals) was added to 100 parts of conjugated diene rubber, then steam stripping was used to remove the solvent and the remainder was dried in vacuo at 60° C. for 24 hours to obtain a solid conjugated diene rubber. The obtained conjugated diene rubber of Example 1 had a weight average molecular weight (Mw) of 527000, a molecular weight distribution (Mw/Mn) of 1.30, and a coupling rate of 53.1%. Further, the obtained conjugated diene rubber of Example 1 was evaluated for shape stability in accordance with the above method, whereby the index of shape stability (value when indexed to the results of Comparative Example 1 as 100, same below in the examples and comparative examples) was 30.

Example 2

Except for using 0.16 mmol of 1,2-bis(trichlorosilyl) ethane instead of 0.16 mmol of 1,6-bis(trichlorosilyl) hexane, the same procedure was followed as in Example 1 to obtain a solid conjugated diene rubber. The obtained conjugated diene rubber of Example 2 had a weight average molecular weight (Mw) of 508000, a molecular weight distribution (Mw/Mn) of 1.30, and a coupling rate of 52.0%. Further, the obtained conjugated diene rubber of Example 2 was evaluated for shape stability in accordance with the above method, whereby the index value of the shape stability was 32.

Example 3

Except for using 0.16 mmol of tin tetrachloride instead of 0.16 mmol of 1,6-bis(trichlorosilyl)hexane, the same procedure was followed as in Example 1 to obtain a solid conjugated diene rubber. The obtained conjugated diene rubber of Example 3 had a weight average molecular weight (Mw) of 522000, a molecular weight distribution (Mw/Mn) of 1.29, and a coupling rate of 53.0%. Further, the obtained conjugated diene rubber of Example 3 was evaluated for shape stability in accordance with the above method, whereby the index value of the shape stability was 38.

Example 4

Except for using 0.16 mmol of silicon tetrachloride instead of 0.16 mmol of 1,6-bis(trichlorosilyl)hexane, the same procedure was followed as in Example 1 to obtain a solid conjugated diene rubber. The obtained conjugated diene rubber of Example 4 had a weight average molecular weight (Mw) of 532000, a molecular weight distribution (Mw/Mn) of 1.33, and a coupling rate of 54.2%. Further, the obtained conjugated diene rubber of Example 4 was evaluated for shape stability in accordance with the above method, whereby the index value of the shape stability was 25.

Example 5

Except for using 0.16 mmol of tin tetrachloride instead of 0.16 mmol of 1,6-bis(trichlorosilyl)hexane and using 8.06 mmol of 2,2-diethoxy-8-(4-methylpiperazinyl)methyl-1,6-dioxa-2-silacyclooctane (compound of the general formula (3) where $X^1$=OCH$_2$CH$_3$, r=2, $R^5$=CH$_3$) instead of 8.06 mmol of 2,2-dimethoxy-8-(4-methylpiperazinyl)methyl-1,6-dioxa-2-silacyclooctane, the same procedure was followed as in Example 1 to obtain a solid conjugated diene rubber. The obtained conjugated diene rubber of Example 5 had a weight average molecular weight (Mw) of 466000, a molecular weight distribution (Mw/Mn) of 1.28, and a coupling rate of 48.0%. Further, the obtained conjugated diene rubber of Example 5 was evaluated for shape stability in accordance with the above method, whereby the index value of the shape stability was 70.

Example 6

Except for not adding 1,6-bis(trichlorosilyl)hexane, the same procedure was followed as in Example 1 to obtain a solid conjugated diene rubber. The obtained conjugated diene rubber of Example 6 had a weight average molecular weight (Mw) of 428000, a molecular weight distribution (Mw/Mn) of 1.26, and a coupling rate of 43.1%. Further, the obtained conjugated diene rubber of Example 6 was evaluated for shape stability in accordance with the above method, whereby the index value of the shape stability was 66.

Comparative Example 1

Except for not adding 1,6-bis(trichlorosilyl)hexane and using, instead of 8.06 mmol of 2,2-dimethoxy-8-(4-methylpiperazinyl)methyl-1,6-dioxa-2-silacyclooctane, a polyorganosiloxane represented by the following formula (5) such that in the state of a 20 wt % concentration xylene solution, the content of the epoxy groups becomes an amount corresponding to 0.33 times mole of the n-butyllithium which was used, the same procedure was followed as in Example 1 to obtain a solid conjugated diene rubber. The obtained conjugated diene rubber of Comparative Example 1 had a weight average molecular weight (Mw) of 536000, a molecular weight distribution (Mw/Mn) of 1.35, and a coupling rate of 51.0%. Further, the obtained conjugated diene rubber of Comparative Example 1 was evaluated for shape stability in accordance with the above method. The measurement value was made the reference value (100) of the shape stability test.

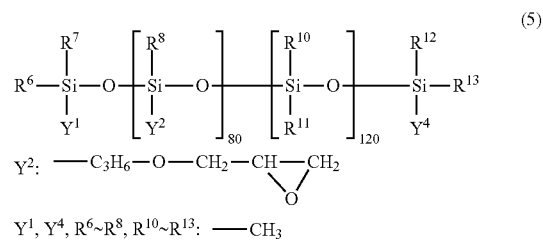

[Production and Evaluation of Rubber Composition and Cross-Linked Rubber]

In a capacity 250 ml Brabender type mixer, 100 parts of the conjugated diene rubber of Example 1 was masticated for 30 seconds, then 50 parts of silica (made by Rhodia, product name "Zeosil 1115MP"), 20 parts of process oil (made by Nippon Oil Corporation, product name "Aromax T-DAE"), and 6.0 parts of the silane coupling agent of bis(3-(triethoxysilyl)propyl)tetrasulfide (made by Degussa, product name "Si69") were added. After kneading for 1.5 minutes with a starting temperature of 110° C., 25 parts of silica (made by Rhodia, product name "Zeosil 1115MP"), 3 parts of zinc oxide, 2 parts of stearic acid, and 2 parts of the antioxidant of N-phenyl-N'-(1,3-dimethylbutyl)-p-phenylenediamine (made by Ouchi Shinko Chemical Industrial, product name "Nocrac 6C") were added. The mixture was further kneaded for 2.5 minutes then the kneaded material was discharged from the mixer. The temperature of the kneaded material after the end of kneading was 150° C. The kneaded material was cooled down to room temperature, then was again kneaded in a Brabender type mixer at a starting temperature of 110° C. for 2 minutes, then the kneaded material was discharged from the mixer. Next, an open roll was used at 50° C. to add 1.40 parts of sulfur, 1.2 parts of the cross-linking accelerator of N-tert-butyl-2-benzothiazolylsulfenamide (product name "Noccelar NS-P", made by Ouchi Shinko Chemical Industrial), and 1.2 parts of the cross-linking accelerator of diphenylguanidine (product name "Noccelar D", made by Ouchi Shinko Chemical Industrial) to the obtained kneaded material. These were kneaded, then the sheet shaped rubber composition was taken out. This rubber composition was cross-linked by pressing at 160° C. for 20 minutes to prepare a test piece of cross-linked rubber. This test piece was evaluated for low heat buildup property and wet grip. The conjugated diene rubber of Examples 2 to 6 and Comparative Example 1 were respectively similarly processed to prepare test pieces of cross-linked rubber. These test pieces were evaluated for low heat buildup property and wet grip. Table 1 shows these results.

TABLE 1

| | Formation of polymer block (A) at a starting end of polymerization | Coupling agent | Modifying agent | Low heat buildup property (index) | Wet grip (index) |
|---|---|---|---|---|---|
| Example 1 | Yes | 1,6-bis(trichloro-silyl)hexane | N-methylpiperazine-CH2-CH(O-)-CH2-CH2-CH2-O-Si(OMe)2 (cyclic silyl ether with dimethoxysilyl) | 91 | 115 |
| Example 2 | Yes | 1,6-bis(trichloro-silyl)ethane | N-methylpiperazine-CH2-CH(O-)-CH2-CH2-CH2-O-Si(OMe)2 (cyclic silyl ether with dimethoxysilyl) | 91 | 114 |
| Example 3 | Yes | Tin tetrachloride | N-methylpiperazine-CH2-CH(O-)-CH2-CH2-CH2-O-Si(OMe)2 (cyclic silyl ether with dimethoxysilyl) | 91 | 117 |
| Example 4 | Yes | Silicon tetrachloride | N-methylpiperazine-CH2-CH(O-)-CH2-CH2-CH2-O-Si(OMe)2 (cyclic silyl ether with dimethoxysilyl) | 89 | 118 |
| Example 5 | Yes | Tin tetrachloride | N-methylpiperazine-CH2-CH(O-)-CH2-CH2-CH2-O-Si(OEt)2 (cyclic silyl ether with diethoxysilyl) | 87 | 120 |
| Example 6 | Yes | None | N-methylpiperazine-CH2-CH(O-)-CH2-CH2-CH2-O-Si(OMe)2 (cyclic silyl ether with dimethoxysilyl) | 90 | 120 |
| Comparative Example 1 | Yes | None | Epoxylated organosiloxane | 100 | 100 |

The conjugated diene rubber obtained by the method of production of a conjugated diene rubber of the present invention (Examples 1 to 6) is excellent in shape stability, and, as will be understood from Table 1, the cross-linked rubber obtained using the conjugated diene rubber obtained by the method of production of a conjugated diene rubber of the present invention is excellent in low heat buildup property and wet grip compared with cross-linked rubber obtained using conjugated diene rubber end-modified by a conventional technique (Comparative Example 1).

The invention claimed is:

1. A method of production of a conjugated diene rubber comprising
   a step of polymerizing isoprene or a monomer mixture containing isoprene and an aromatic vinyl monomer in an inert solvent by using a polymerization initiator so as to form a polymer block (A) having an active end and containing 80 to 100 wt % of isoprene monomer units and 0 to 20 wt % of aromatic vinyl monomer units,
   a step of mixing the polymer block (A) having an active end and 1,3-butadiene or a monomer mixture containing 1,3-butadiene and an aromatic vinyl monomer to continue a polymerization reaction and forming a polymer block (B) having an active end and containing 50 to 100 wt % of 1,3-butadiene monomer units and 0 to 50 wt % of aromatic vinyl monomer units as a continuation of the polymer block (A) so as to obtain a conjugated diene polymer chain having an active end, and
   a step of reacting a compound represented by the following general formula (1) with the active end of the conjugated diene polymer chain having an active end:

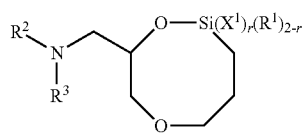 (1)

wherein, in the general formula (1), $X^1$ represents a functional group selected from a hydrocarbyloxy group, halogen group, and hydroxyl group, $R^1$ represents a substituted or unsubstituted hydrocarbon group, each of $R^2$ and $R^3$ independently represents a substituted or unsubstituted hydrocarbon group, $R^2$ and $R^3$ may bond with each other to form a ring structure together with the nitrogen atom represented by "N" in the general formula (1), and, when forming the ring structure, $R^2$ and $R^3$ may form a ring structure together with a hetero atom other than the nitrogen atom represented by the "N" in addition to the nitrogen atom represented by the "N", "r" is an integer of 0 to 2.

2. The method of production of a conjugated diene rubber according to claim 1 further comprising, after obtaining the conjugated diene polymer chain having an active end, a step of reacting part of the active ends with a tin halide, silicon halide, or compound represented by the general formula (2):

 (2)

wherein, in the general formula (2), $R^4$ represents a substituted or unsubstituted bivalent hydrocarbon group, $X^2$ represents a halogen group, and M represents a silicon atom or tin atom.

3. The method of production of a conjugated diene rubber according to claim 1 wherein in the conjugated diene polymer chain having an active end, a weight ratio of the polymer block (A) and polymer block (B) is, by (weight of polymer block (A))/(weight of polymer block (B)), 0.001 to 0.1.

4. The method of production of a conjugated diene rubber according to claim 1 wherein, in the general formula (1), $R^2$ and $R^3$ bond with each other to form a piperazine ring structure together with the nitrogen atom represented by the "N" in the general formula (1).

5. A conjugated diene rubber obtained by the method of production according to claim 1.

6. A rubber composition comprising 100 parts by weight of a rubber component containing the conjugated diene rubber according to claim 5 and 10 to 200 parts by weight of silica.

7. The rubber composition according to claim 6 further comprising a cross-linking agent.

8. A cross-linked rubber obtained by cross-linking the rubber composition according to claim 7.

9. A tire including the cross-linked rubber according to claim 8.

* * * * *